US010979215B2

(12) United States Patent
Simske et al.

(10) Patent No.: US 10,979,215 B2
(45) Date of Patent: Apr. 13, 2021

(54) PRINTER ENCRYPTION

(71) Applicant: HEWLETT-PACKARD DEVELOPMENT COMPANY, L.P., Houston, TX (US)

(72) Inventors: Steven J. Simske, Fort Collins, CO (US); Malgorzata M. Sturgill, Fort Collins, CO (US); Cesare Gritti, Boulder, CO (US); Shivaun Albright, Roseville, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 308 days.

(21) Appl. No.: 16/089,876

(22) PCT Filed: Sep. 9, 2016

(86) PCT No.: PCT/US2016/051059
§ 371 (c)(1),
(2) Date: Sep. 28, 2018

(87) PCT Pub. No.: WO2018/048426
PCT Pub. Date: Mar. 15, 2018

(65) Prior Publication Data
US 2019/0116026 A1 Apr. 18, 2019

(51) Int. Cl.
*G06F 21/70* (2013.01)
*G06F 21/62* (2013.01)
(Continued)

(52) U.S. Cl.
CPC .......... *H04L 9/0656* (2013.01); *G06F 21/602* (2013.01); *G06F 21/73* (2013.01);
(Continued)

(58) Field of Classification Search
CPC . G06F 21/62; G06F 21/70; H04L 9/32; H04L 9/3228
(Continued)

(56) References Cited

U.S. PATENT DOCUMENTS 6,480,831 B1 11/2002 Cordery et al.
6,912,374 B2 6/2005 Clough et al.
(Continued)

FOREIGN PATENT DOCUMENTS

| GB | 2371899 A | 1/2002 | |
|---|---|---|---|
| WO | 2015157720 A2 | 10/2015 | |
| WO | WO-2015158425 A1 * | 10/2015 | ........... G06F 3/1238 |

OTHER PUBLICATIONS

Sherwood, "Raspberry Pi Thermal Printer One Time Pads", Adafruit Industries, Retrieved from Internet: https://cdn-learn.adafruit.com/downloads/pdf/raspberry-pi-thermal-printer-one-time-pads.pdf, 2013, 21 pages.

*Primary Examiner* — Izunna Okeke
(74) *Attorney, Agent, or Firm* — HP Inc. Patent Department

(57) ABSTRACT

Examples associated with printer encryption are described. One example printer includes a data store to store a one-time pad. An encryption module may encrypt a message using the one-time pad. The encryption module also transmits the encrypted message to a trusted device that stores a copy of the one-time pad. A decryption module uses the one-time pad to decrypt a received message form the trusted device. The decryption module also controls the printer to perform an action based on the received message. A refresh module replaces the one-time pad during a service event.

10 Claims, 8 Drawing Sheets

(51) Int. Cl.
- *H04L 9/06* (2006.01)
- *H04L 29/06* (2006.01)
- *G06F 21/73* (2013.01)
- *G06F 21/85* (2013.01)
- *G06F 21/60* (2013.01)
- *H04L 9/08* (2006.01)
- *H04N 1/32* (2006.01)

(52) U.S. Cl.
CPC ............ *G06F 21/85* (2013.01); *H04L 9/0869* (2013.01); *H04L 9/0891* (2013.01); *H04L 9/0897* (2013.01); *H04L 63/0428* (2013.01); *H04L 63/0435* (2013.01); *H04L 63/067* (2013.01); *H04N 1/32112* (2013.01); *H04L 2463/082* (2013.01)

(58) Field of Classification Search
USPC .................... 713/164, 191, 189, 193; 380/28
See application file for complete search history.

(56) References Cited

U.S. PATENT DOCUMENTS

| | | |
|---|---|---|
| 7,375,835 B1 | 5/2008 | Hull et al. |
| 9,054,871 B2 | 6/2015 | Horstmeyer et al. |
| 9,288,206 B2 | 3/2016 | Kruglick |
| 2007/0172054 A1* | 7/2007 | Munro ................. H04L 9/3226 380/28 |
| 2014/0337615 A1 | 11/2014 | Tomkow |

\* cited by examiner

PRINTER ENCRYPTION

BACKGROUND

A one-time pad is string of random bits, shared in secret between two or more parties. These bits can be used to effectively encrypt messages between the parties using successive portions of the secure key that are not reused for successive transmissions. By way of illustration, a one-time pad of length m*n may be able to facilitate encryption of m messages of length n or less without reusing a portion of the one-time pad. Unless an adversary has access to a copy of the one-time pad itself, unauthorized decryption of a message is considered difficult because all possible messages of length n or less are possible.

BRIEF DESCRIPTION OF THE DRAWINGS

The present application may be more fully appreciated in connection with the following detailed description taken in conjunction with the accompanying, drawings.

DETAILED DESCRIPTION

Systems, methods, and equivalents associated with printer encryption are described. A printer and a secure server may communicate using a one-time pad to secure messages transmitted between the printer and the secure server. Initially, the one-time pad may be embedded in the printer and the secure server as a part of the process of manufacturing and/or distributing the printer. Because the printer and secure server may be controlled or effectively controlled by a single party prior to distribution of the printer, the same one-time pad may be embedded in the printer and secure server without transmitting the one-time pad over a connection that compromises security of the one-time pad.

Over time, the printer and secure server may begin to exhaust the stored the one-time pad. Consequently, refreshing the one-time pad may be desirable to facilitate continued secure communication between the printer and the secure server. In some examples, refreshing the one-time pad may be achieved in association with a maintenance event for the printer. By way of illustration, a technician performing a service call to repair the printer may be able to deliver a new, unused one-time pad to the printer. In other examples, a fresh one-time pad may be delivered to the printer via a replacement part delivered securely by trusted party and configured specifically for the printer. By way of illustration, a print material cartridge (e.g., ink cartridge) may also include a secure memory intended to deliver a replacement one-time pad to a specific printer when the print material cartridge is embedded in that printer.

As used herein, a print material may refer to materials used by the printer during the process of printing by a printer. What print materials are used may depend on the type of printer in which systems and methods disclosed herein have been implemented. For example, a paper printer may use ink, toner, various finishing substances, and so forth. A 3D printer may use a variety of materials for constructing a three-dimensional object. Consequently, a print material container may refer to a container by which a print material is delivered to a printer. The print material container may be installed in the printer, connected to the printer via a delivery mechanism, and so forth.

Figure 1:
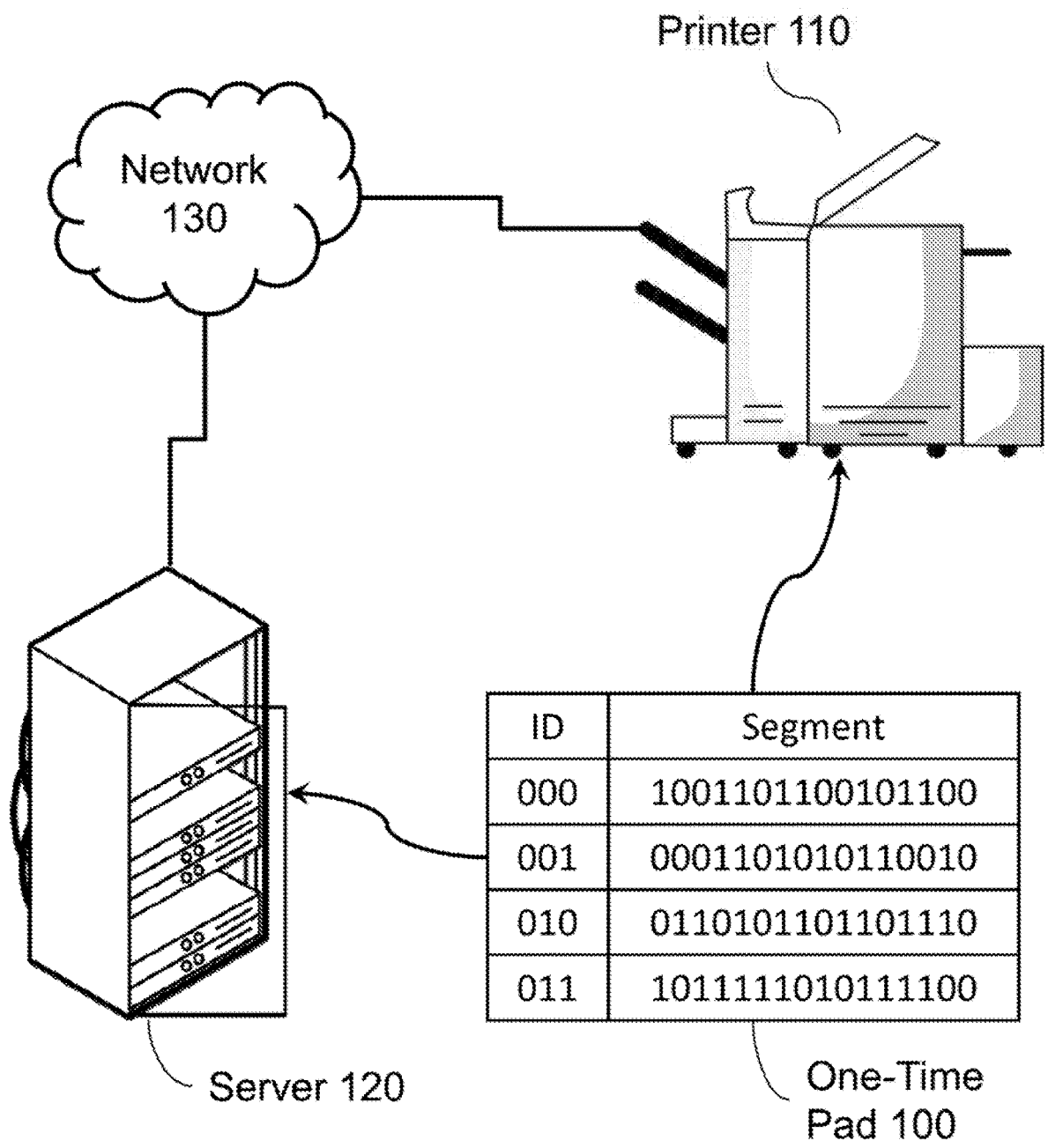
FIG. 1 illustrates an example devices associated with printer encryption.

FIG. 1 illustrates example devices associated with printer encryption. It should be appreciated that the items depicted in FIG. 1 are illustrative examples, and many different systems, devices, and so forth, may operate in accordance with various examples.

FIG. 1 illustrates an example printer 110 and an example server 120. Printer 110 and server 120 may be configured to communicate securely over a network 130 using a one-time pad 100. Here, one-time pad 100 is illustrated as having 4 segments and corresponding identifiers. However, in practice, one-time pad 100 may be arbitrarily large depending on a size of a memory made available for storing one-time pad 100. Additionally, identifiers for the segments may not be stored alongside segments, and instead an offset may be used to communicate which segment has been used to encrypt a message between printer 110 and server 120. Segment length may also vary depending on types and/or lengths of messages intended to be encrypted using one-time pad 100.

In various examples, one-time pad 100 may be embedded in printer 110 and server 120 during the process of producing and/or distributing printer 100 of printer 110. Embedding one-time pad 100 during production of printer 110 may ensure that printer 110 and server 120 are under the control of a single trusted entity when the one-time pad is generated and initially embedded. This may be desirable because one-time pads facilitate strong encryption when the one-time pad is not known by third parties.

When printer 110 seeks to transmit a message to server 120, first printer 110 may encrypt the message using a segment of one-time pad 100. If the length of the message used by printer 100 exceeds the length of a segment, printer 110 may use multiple segments of one-time pad 100. Encrypting the message may involve applying an XOR operation to the segment(s) of one-time pad 100 that is chosen by printer 110 and the message printer 110 intends to transmit to server 120. In other examples, printer 110 may also apply further encryption techniques to further secure the message, authenticate itself to server 120, and so forth. For example, printer 110 may XOR an identifier unique to printer 110 with the result of encrypting the message to further prove its identity to server 120.

Printer 110 may then transmit the message to server 120 over network 130. In some examples, printer 110 may also transmit an identifier to the segment of one-time pad 100 used to encrypt the message. This may specifically identify to server 120 which segment of one-time pad 100 was used. In other examples, printer 110 and server 120 may be configured to automatically know based on a programmed sequence which segment of one-time pad is used. By way of illustration, printer 110 may be configured to sequentially use odd numbered segments of one-time pad 100 for encrypting messages transmitted to server 120, and server 120 may be configured to sequentially use even numbered segments of one-time pad 100 for encrypting messages transmitted to printer 110. In these examples, various techniques may be employed to prevent encrypted messages from being transmitted out of order. For example, messages subsequent to a transmitted message may be held until the transmitted message is acknowledged as received to ensure messages are received in order, or messages may be time-stamped or order stamped so that message ordering may be recovered at a later time.

Upon receiving the encrypted message from printer 110, server 120 may decrypt the message using the segment of one-time pad 100 that was used by printer 110 to encrypt the message. Server 120 may figure out the segment used by one-time pad 100 based on, for example, a segment identifier transmitted by printer 110, a pre-agreed segment usage plan, and so forth. In examples where printer 110 used the XOR operator to generate the encrypted message, server 120 may apply the XOR operation to the segment of one-time pad 100 and the encrypted message to retrieve the original message that printer 100 sought to transmit to server 120. Server 120 may then take some action appropriate to the message received from printer 100. In examples, where server 120 seeks to transmit a sensitive message to printer 110, server 120 and printer 110 may take a similar series of actions, although with server 120 encrypting the sensitive message, and printer 110 decrypting the sensitive message.

Due to the nature of one-time pad usage, the more often a segment is used, the more likely it is that a segment can be determined by a third party. Further, if the third party determines enough of one-time pad 100, some techniques may allow the third party to determine the remainder of one-time pad 100 depending on how one-time pad 100 was generated. Consequently, upon using a segment of one-time pad 100 to encrypt and/or decrypt a message, printer 110 and server 120 may seek to prevent themselves from reusing that segment. This may be achieved by marking segments of one-time pad 100 as used segments as the segments are used to generate encrypted messages that are transmitted between printer 110 and server 120. While avoiding reusing segments may be desirable, there may be scenarios where segments are reused, reused for an alternative purpose, and so forth.

As a result of these actions, printer 110 and server 120 may effectively "use up" one-time pad 100 over time. To continue communicating securely, actions may be taken to replace one-time pad 100 with a fresh one-time pad. In cases where server 120 has remained under the control of a party who takes advantage of the encryption of messages between server 120 and printer 110, replacing the one-time pad in server 120 may not involve transmitting the one-time pad over an unsecured network. Thus, various techniques may be employed to ensure the new one-time pass can be embedded in the secure server without it being intercepted or otherwise obtained by a third party.

However, printer 110 may have been distributed to a third party who uses the printer for a variety of functions, and a secure network connection to printer 110 may not be guaranteed. In this scenario, delivering a replacement one-time pad to printer 110 may involve delivering the replacement one-time pad in association, with a maintenance event for printer 110. For example, for printers that are occasionally serviced by a technician, the technician may be able to install the one-time pad in the printer during one of these service events. In other examples, a supply contract between the third party using printer 110 and the party operating server 120 may be an alternate technique by which the replacement one-time pad may be delivered to printer 110.

By way of illustration, the third party using printer 10 may contract to receive periodic print material (e.g., ink, toner, a 3D print material) refills. In some examples, these refills may be automatically requested by printer 110 when it determines it is running low on print material. When one-time pad 100 is also running out of unused segments, a replacement one-time pad may be requested by printer 110, generated by an operator of server 120, and embedded in a print material container that is going to be delivered to printer 110. When the print material container is installed in printer 110, printer 110 may download the replacement one-time pad to facilitate continued secure communication with server 120.

In some scenarios, printer 110 and/or server 120 may determine that the rate at which one-time pad 100 is being used may cause one-time pad 100 to run out before it can be replaced. This may occur, for example, when printer 110 is not due for maintenance for some time, there has been an unexpected spike in one-time pad usage, and so forth. Printer 110 and server 120 may make this determination based on predefined thresholds. These thresholds may relate to, for example, a usage rate of one-time pad 100, an absolute number of remaining one-time pad segments, a percentage of remaining one-time pad segments, and so forth.

When the number of remaining one-time pad segments is running low, printer 110 and server 120 may take measures to increase the lifespan of one-time pad 100. By way of illustration, printer 110 may begin using segments of one-time pad 100 as a seed for a random number generator. Random numbers generated in this manner may be used to, for example, encrypt further messages between printer 110 and server 120, digitally sign transmissions between printer 110 and server 120, generate a certificate, validate a request for a new one-time pad, and so forth. Because printer 110 and server 120 have access to the same random number generator seed in the form of one time pad 100, security of communications may be ensured until a replacement one time pad can be delivered to printer 110.

Due to the strong security provided by usage of one-time pads, challenges associated with network security may instead be shifted to challenges associated with physical security. Assuming that one-time pad 100 itself can be prevented from being transmitted from printer 110 and/or server 120, it may be difficult to obtain copies of one-time pad 100 without physical access to one of printer 110 and server 120 and the secure storages embedded therein. Consequently, printer 110 may be able to perform a variety of functions in response to signals received from server 120 encrypted based on one-time pad 100.

For example, server 120 may control printer 110 to access a resource. The resource may be a document or webpage for printer 110 to print. In other examples, the resource or signal from server 120 may control printer 110 to configure itself, a network on which printer 110 is operating, another device on the network, and so forth.

In other examples, one-time pad 100 may allow printer 110 to complete a transaction. By way of illustration transaction may be associated with printer 110 itself, such that printer 110 is controlled to print a document against the account of a specific entity. Alternatively, the printer 110 may control another printer to print a document, and effectively use one-time pad 100 as credit or currency that is used up as pages are printed by the other printer(s). In other examples, due to the security provided by one-time pad 100, validation of additional types of transactions may also be possible.

One-time pad 100 may also facilitate, for example, authentication of printer 110 and server 120 to one another, exchange of temporary communication keys associated with a transaction between printer 110 and server 120, and so forth. One-time pad 100 may also facilitate authentication of printer 110 and/or server 120 to third parties. By way of illustration, printer 110 could act as a factor in a multi-factor authentication system, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
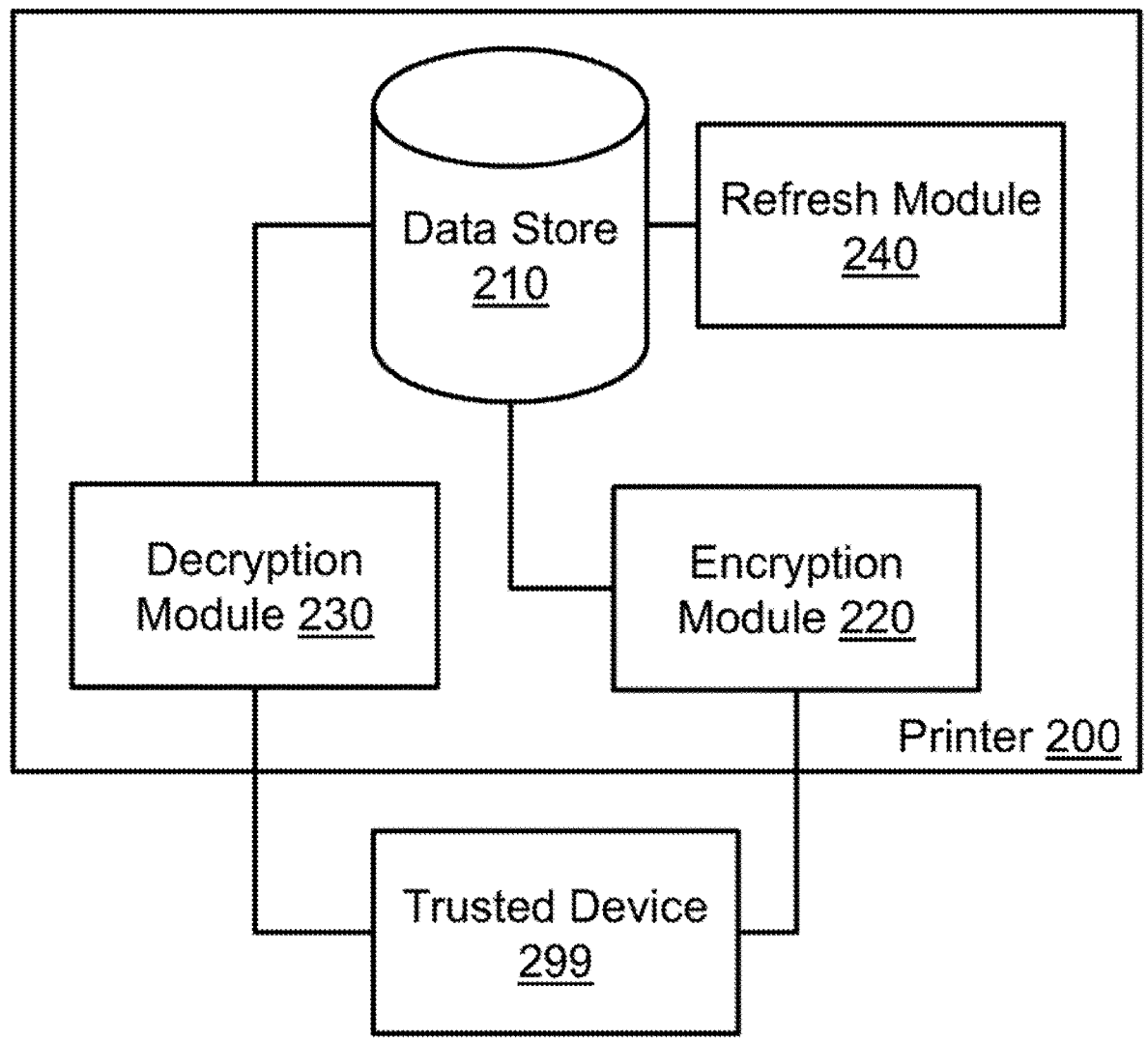
FIG. 2 illustrates an example printer associated with printer encryption.

FIG. 2 illustrates an example printer 200 associated with printer encryption. Printer 200 may be, for example, an office printer, a desktop printer, an industrial printer, a 3D printer, and so forth. Printer 200 includes a data store 210. Data store 210 may be, for example, a secure storage, a hard disk, and so forth embedded within printer 200. Data store 210 may store a one-time pad. A one-time pad may be a randomly generated series of data. In some examples, the one-time pad may have m sequences of length n, allowing encryption of m messages of up to length n. The one-time pad may be used by printer 200 to securely communicate with a trusted device sharing a copy of the one-time, using the one-time pad as a basis for encryption of messages between printer 200 and the trusted device.

Printer 200 also includes an encryption module 220. Encryption module 220 may encrypt a message using the one-time pad stored in data store 210. For example, encryption module 220 may select a segment(s) of the one-time pad and perform an XOR operation between the segment(s) and the message to create an encrypted message. Encryption module 220 may also transmit the encrypted message to a trusted device 299. Trusted device 299 may be, for example, another device a copy of the one-time pad is embedded into or is otherwise has access to. In some examples, the trusted device may be controlled by a manufacturer of printer 200, or operated by a partner of the manufacturer. The trusted device may be, for example, a server that printer 200 will communicate with over an unsecured network. Trusted device may also store a copy of the one-time pad. In one example, encryption module 220 may transmit the encrypted message to a cloud service. In this example, trusted device 299 may be a member of the cloud service. Further, encrypted module 220 may uniquely identify printer 200 to the cloud service using the one-time pad, a unique device identifier, and so forth.

Printer 200 also includes a decryption module 230. Decryption module 230 may decrypt a received message using the one-time pad. The received message may be received from trusted device 299. Decryption module may control printer 200 to perform an action based on the received message. In various examples, decryption module 230 may control printer 200 to access a resource, configure a network of which the printer is a member, configure a device, configure printer 200, complete a transaction, display information, and so forth.

Printer 200 also includes a refresh module 240. Refresh module 240 may replace the one-time pad during a service event. In one example, the service event may be a replacement of a print consumable. Consequently, the print consumable may store a replacement one-time pad generated specifically for printer 200 during production of the print consumable. The print consumable may be, for example, a print material container, a replacement part, and so forth.

Figure 3:
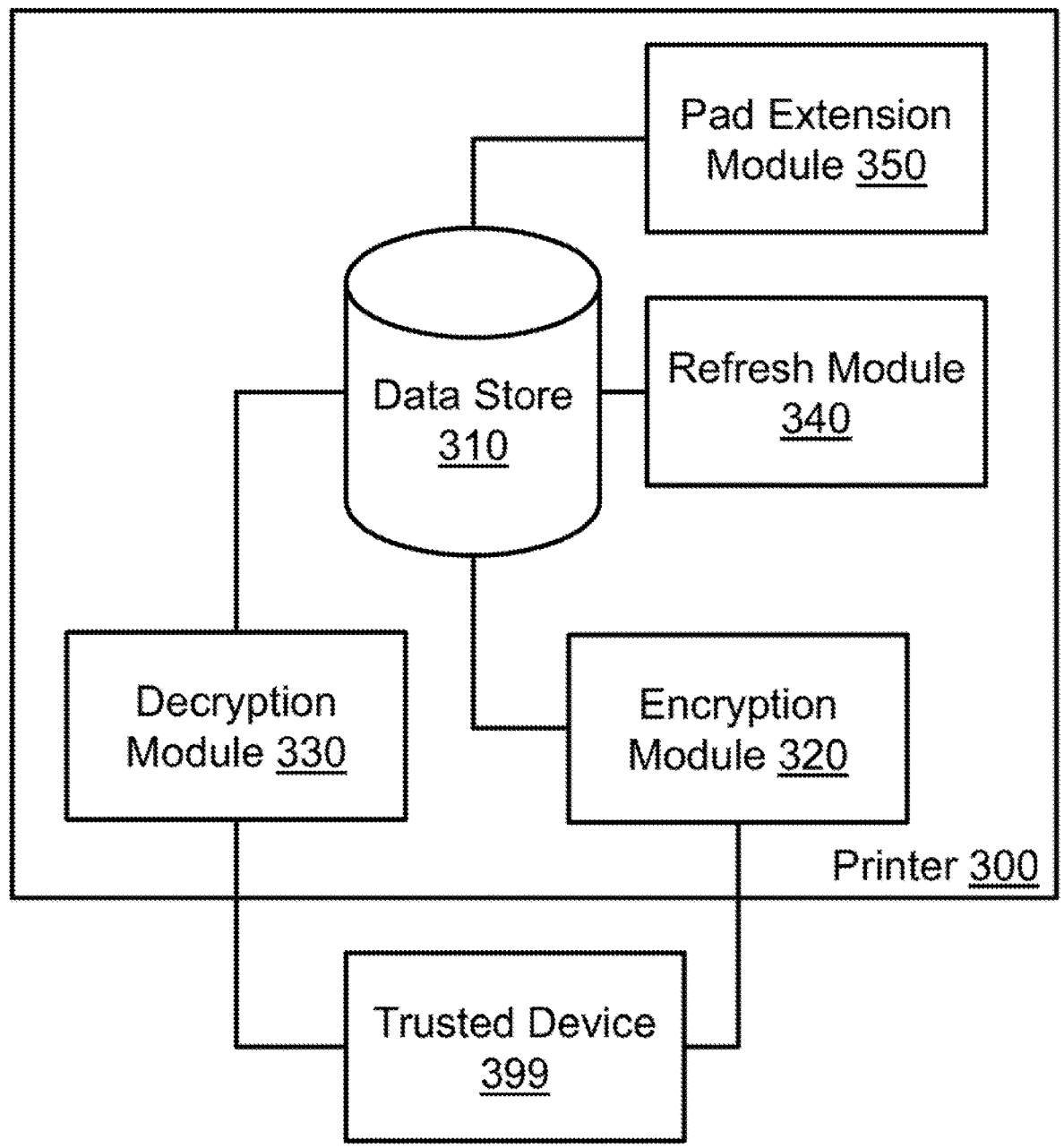
FIG. 3 illustrates another example printer associated with printer encryption.

FIG. 3 illustrates a printer 300 associated with printer encryption. Printer 300 includes several items similar to those described above with reference to printer 200 (FIG. 2). For example, printer 300 includes a data store 310 storing a one-time pad, an encryption module 320, a decryption module 330, and a refresh module 340.

Printer 300 also includes a pad extension module 350. Pad extension module 350 may monitor a size of a remaining portion of the one-time pad. Upon determining that the remaining portion of the one-time pad has fallen below a known threshold, pad extension module 350 may begin using the remaining portion of the one-time pad as a seed for random numbers. The random numbers may be used for, for example, encryption, digital signing, generating a certificate, validating a request for a new-time pad, obfuscating messages between the printer and other devices connected to the printer, and so forth.

Figure 4:
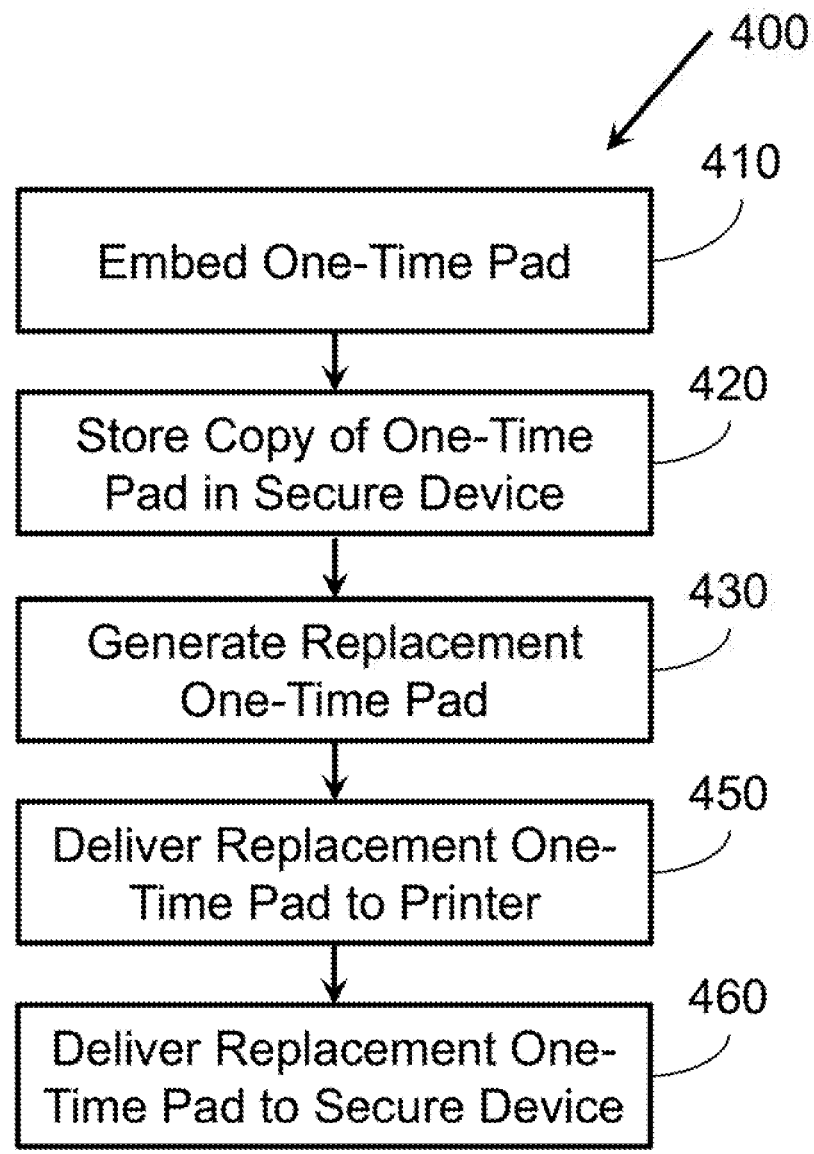
FIG. 4 illustrates a flowchart of example operations associated with printer encryption.

FIG. 4 illustrates an example method 400 associated with printer encryption. Method 400 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 400 includes embedding a one-time pad in a printer at 410. The one-time pad may be embedded in the printer as a part of the process of manufacturing and/or distributing the printer. This may ensure that the one-pad is embedded in the printer at a point when there are assurances that the one-time pad is not obtainable by a third party which could compromise the security of the one-time pad.

Method 400 also includes storing a copy of the one-time pad in a secure device at 420. The printer and the secure device may use the one-time pad to encrypt and exchange messages. Messages may be used to, for example, control the printer to access a resource, configure a network associated with the printer, configure a device connected to the printer, configure the printer, complete a transaction, display information on the printer, authenticate the printer to the secure device, authenticate the secure device to the printer, track usage of a printer resource by a user, authenticate the secure device to a third party, act as a factor in a multi-factor authentication system, control the printer to print a document, and so forth.

Method 400 also includes generating a replacement one-time pad for the printer at 440. Method 400 also includes delivering the replacement one-time pad to the printer at 450. The replacement one-time pad may be delivered to the printer in association with a printer maintenance event. In one example, the replacement one-time pad may be delivered to the printer via a print consumable. Consequently, the printer maintenance event may involve installing the print consumable in the printer.

Method 400 also includes delivering a copy of the one-time pad to the secure device at 460. In various examples, the entity generating the replacement one-time pad and providing the replacement one-time pad to the printer may also be the entity operating the secure device. In this example, the secure device may generate the one-time pad itself and then store the one-time pad for later use. In other examples, assurances may be taken so that the one-time pad is not obtained by third parties during delivery of the copy of the one-time pad to the secure device.

Figure 5:
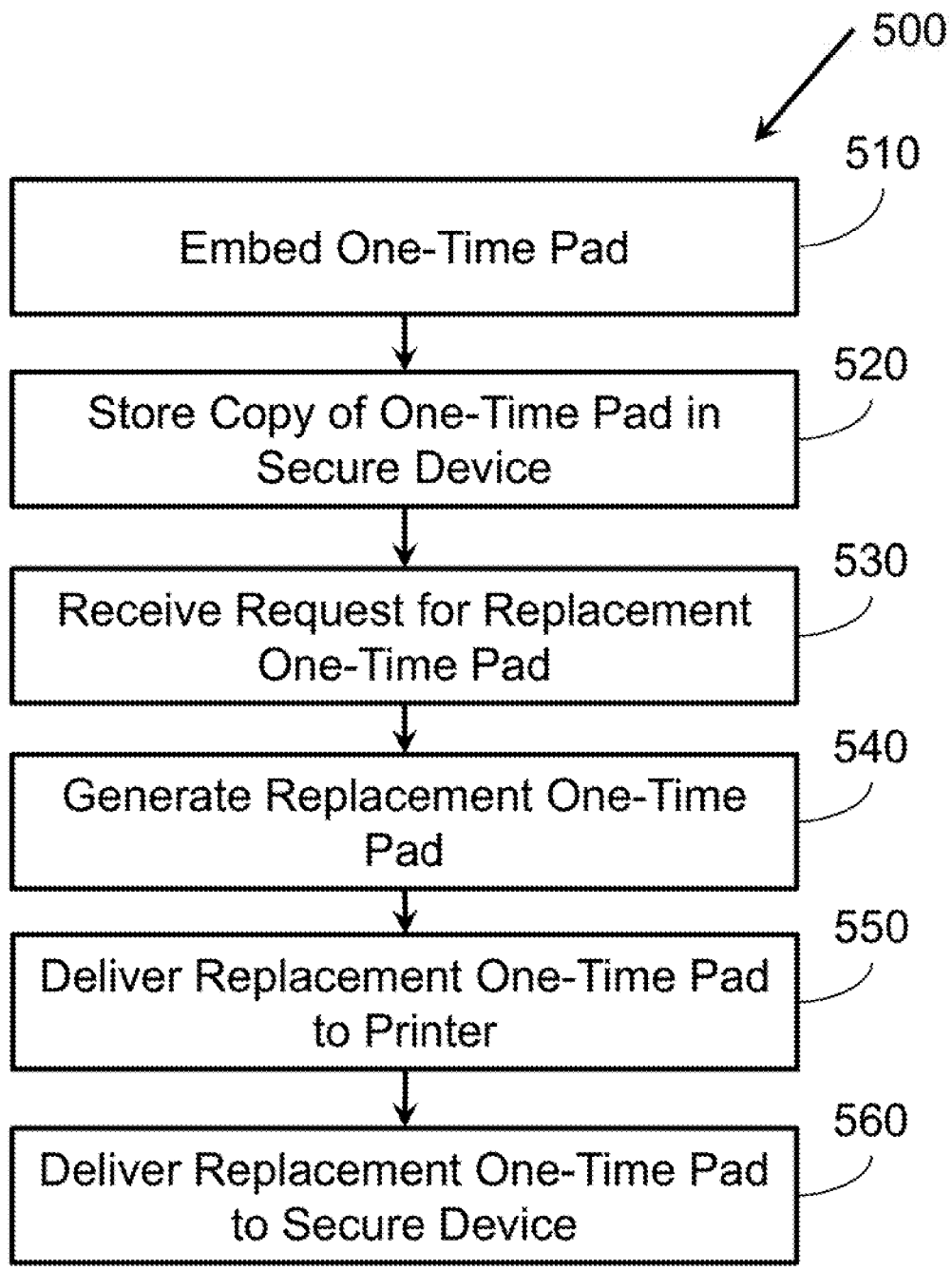
FIG. 5 illustrates another flowchart of example operations associated with printer encryption.

FIG. 5 illustrates a method 500 associated with printer encryption. Method 500 includes several actions similar to those described above with reference to method 400 (FIG. 4). For example, method 500 includes embedding a one-time pad in a printer at 510, storing a copy of the one-time pad in a secure device at 520, generating a replacement one-time pad at 540, delivering the replacement one-time pad to the printer at 550, and delivering the replacement one-time pad to the secure device at 560.

Method 500 also includes receiving a request for the replacement one-time pad at 530. The request may be received from the printer. The request may be encrypted based on a random number generated from a remaining portion of the one-time pad. The request may be generated after the remaining portion of the one-time pad has fallen below a predefined threshold. Using the remaining portion of the one-time pad as a seed for random number generator may facilitate extending the life of the one-time pad when the printer determines the one-time pad is running out of segments. Consequently, in addition to the request for a replacement one-time pad, the printer may also transmit other messages generated using segments of the one-time pad as a seed for a random number generator. In other examples, the one-time pad may facilitate generating an encryption key, certificate, and so forth that can be used to extend the life of the one-time pad until it can be securely replaced.

Figure 6:
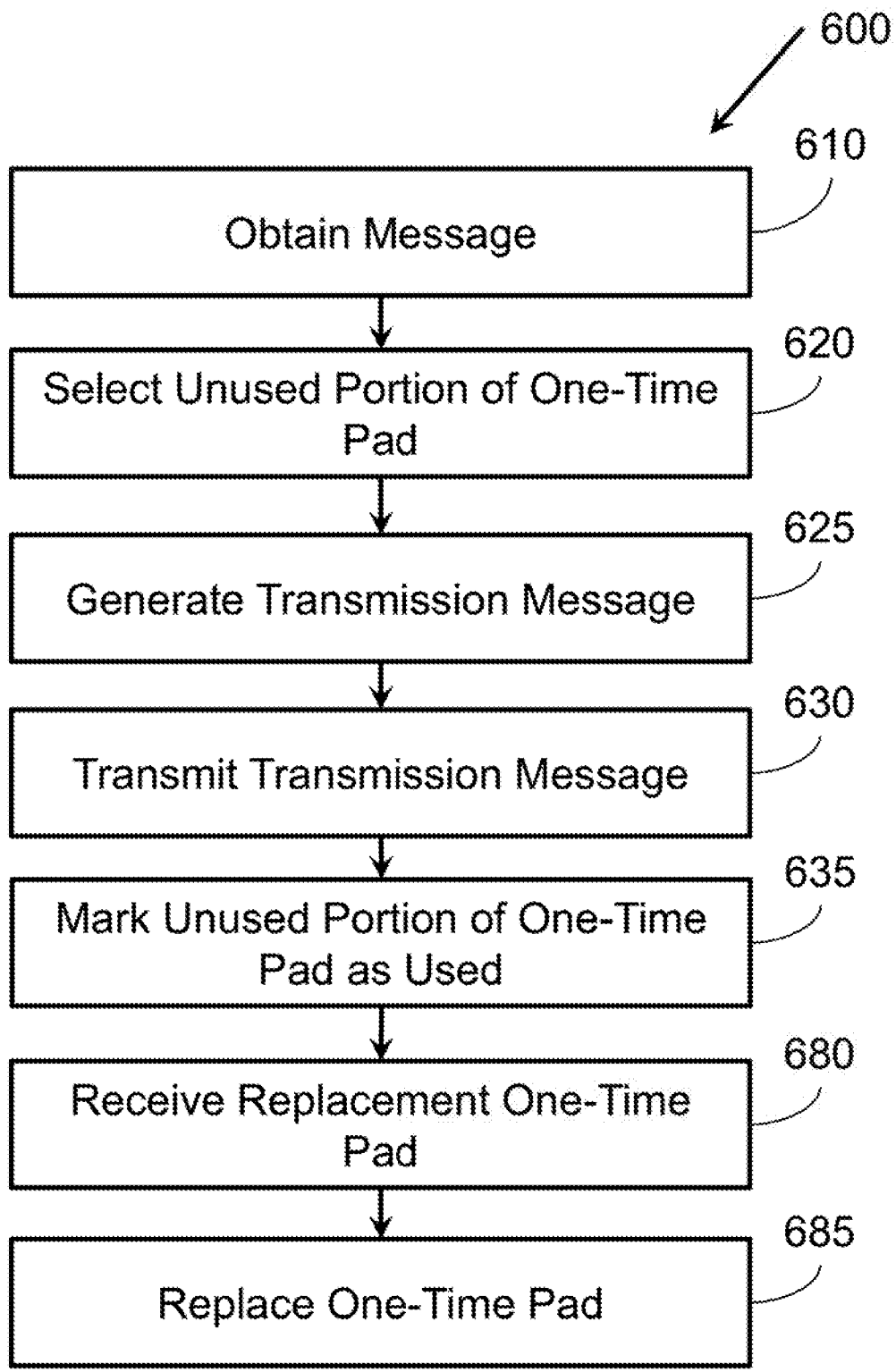
FIG. 6 illustrates another flowchart of example operations associated with printer encryption.

FIG. 6 illustrates a method 600 associated with printer encryption. Method 600 includes obtaining a message at 610. The message may be obtained by a printer. The message may be obtained so the message can be transmitted to a cloud service.

Method 600 also includes selecting an unused portion of a one-time pad at 620. The one-time pad may be stored in the printer. Selecting an unused portion of the one-time pad may be desirable to ensure that messages transmitted using the one-time pad cannot be determined, and that the one-time pad itself cannot be determined. The unused portion selected may be selected to be longer than the message to be transmitted to the cloud service. Where the one-time pad is organized as segments of length m, a number n of segments may be selected from the one-time until n*m exceeds the length of the message to be sent.

Method 600 also includes generating a transmission message at 625. The transmission message may include an identifier to the unused portion of the one-time pad. The transmission message may also include an encrypted version of the message generated by encrypting the message using the unused portion of the one-time pad. Encryption may be achieved by, for example, applying an XOR operation between the message and the unused portion of the one-time pad.

Method 600 also includes transmitting the transmission message at 630. The transmission message may be transmitted to a secure device. The secure device may be associated with the cloud service. The secure device may store a copy of the one-time pad.

Method 600 also includes marking the unused portion of the one-time pad as a used portion at 635. This may prevent later reuse of portions of the one-time pad, or mark previously used portions of the one-time pad for less secure use and/or re-use. Discouraging reuse of portions of the one-time pad may prevent decryption of messages transmitted using reused portions, and/or discovery of the one-time pad.

Method 600 also includes receiving a replacement one-time pad at 680. The replacement one-time pad may be received in association with a maintenance event associated with the printer. The maintenance event may be, for example, a service technician operating on the printer, replacement of a component of the printer (e.g., a print material container), installation of a component to the printer, and so forth. Method 600 also includes replacing the one-time pad at 685. The one-time pad may be replaced with the replacement one-time pad.

Figure 7:
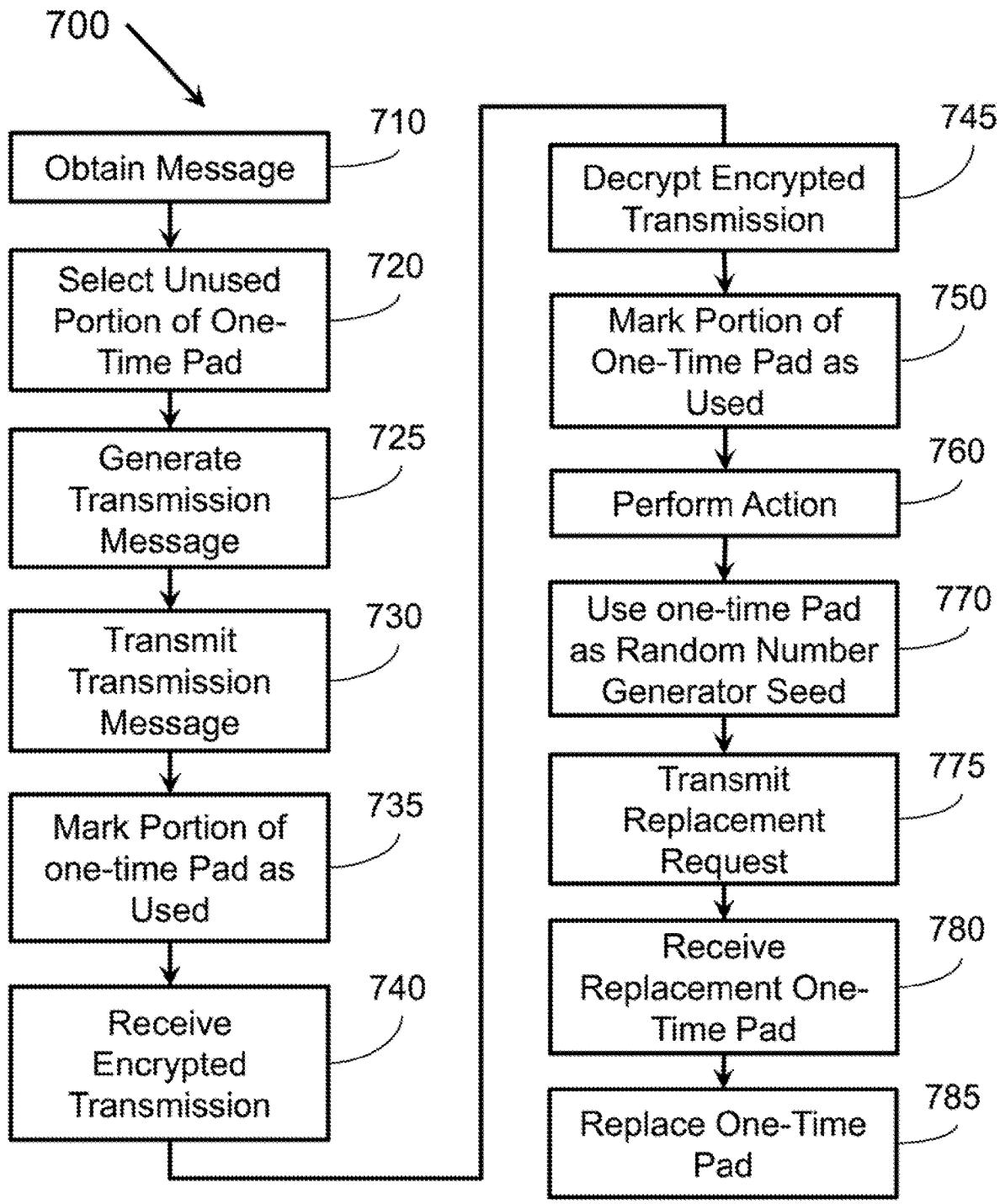
FIG. 7 illustrates another flowchart of example operations associated with printer encryption.

FIG. 7 illustrates a method 700 associated with printer encryption. Method 700 includes several actions similar to those described above with reference to method 600. For example, method 700 includes obtaining a message at 710, selecting an unused portion of a one-time pad at 720, generating a transmission message at 725, transmitting the transmission message at 730, marking the unused portion of the one-time pad as used at 735, receiving a replacement one-time pad at 780, and replacing the one-time pad at 785.

Method 700 also includes receiving an encrypted transmission at 740. The encrypted transmission may be received from the secure device. The encrypted transmission may include an identifier to a decryption portion of the one-time pad. The encrypted transmission may also include a payload portion.

Method 700 also includes decrypting the payload portion of the encrypted transmission at 745. The payload portion of the encrypted transmission may be decrypted using the decryption portion of the one-time pad. Method 700 also includes marking the decryption portion of the one-time pad as a used portion at 750.

Method 700 also includes performing an action at 760. The action may be performed based on the decrypted payload portion. Actions performed at 760 may include, for example, configuring the printer, configuring a network on which the printer is operating, configuring a device connected to the printer directly or via a network, printing a document, accessing a resource, approving a transaction, providing information, and so forth.

Method 700 also includes using a remaining portion of the one-time pad as a seed for a random number generator at 770. The remaining portion of the one-time pad may be used as the seed upon detecting that the remaining portion of the one-time pad has fallen below a predefined threshold.

Method 700 also includes transmitting a request for the replacement one-time pad at 775. The request for the replacement one-time pad may be generated based on a random number obtained from the remaining portion of the one-time pad.

Figure 8:
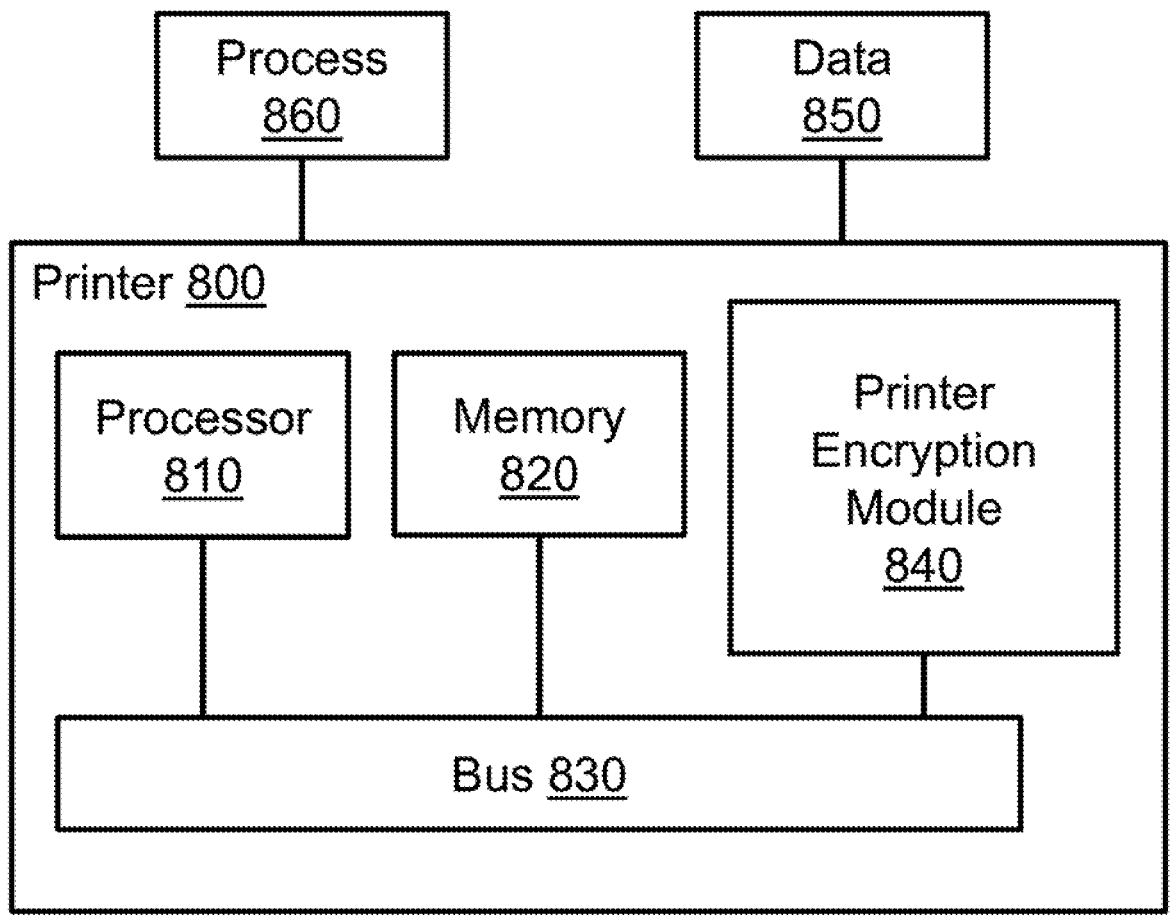
FIG. 8 illustrates an example computing device in which example systems, and methods, and equivalents, may operate.

FIG. 8 illustrates an example computing device in which example systems and methods, and equivalents, may operate. The example computing device may be a printer 800 that includes a processor 810 and a memory 820 connected by a bus 830. Printer 800 includes a printer encryption module 840. Printer encryption module 840 may perform, alone or in combination, various functions described above with reference to the example systems, methods, and so forth. In different examples, printer encryption module 840 may be implemented as a non-transitory computer-readable medium storing processor-executable instructions, in hardware, software, firmware, an application specific integrated circuit, and/or combinations thereof.

The instructions may also be presented to printer 800 as data 850 and/or process 860 that are temporarily stored in memory 820 and then executed by processor 810. The processor 810 may be a variety of processors including dual microprocessor and other multi-processor architectures. Memory 820 may include non-volatile memory (e.g., read only memory) and/or volatile memory (e.g., random access memory). Memory 820 may also be, for example, a magnetic disk drive, a solid state disk drive, a floppy disk drive, a tape drive, a flash memory card, an optical disk, and so on. Thus, memory 820 may store process 860 and/or data 850. Printer 800 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A printer, comprising:
   a data store to store a one-time pad;
   an encryption module to encrypt a message using the one-time pad and to transmit the encrypted message to a trusted device that stores a copy of the one-time pad;
   a decryption module to decrypt, using the one-time pad, a received message from the trusted device and to control the printer to perform an action based on the received message;
   a refresh module to replace the one-time pad during a service event, where the service event is a replacement of a print consumable that stores a replacement one-time pad generated specifically for the printer during production of the print consumable; and
   a pad extension module to monitor a size of a remaining portion of the one-time pad and to begin using the remaining portion of the one-time pad as a seed for random numbers upon determining the size of the remaining portion of the one-time pad falls below a known threshold.

2. The printer of claim 1, where the print consumable is a print material container.

3. The printer of claim 1, where the decryption module controls the printer to one of, access a resource, configure a network of which the printer is a member, configure a device, configure the printer, complete a transaction, and display information.

4. The printer of claim 1, where the encryption module transmits the encrypted message to a cloud service, and where the encrypted module uniquely identifies the printer to the cloud service using the one-time pad.

5. The printer of claim 1, where the random numbers are used for one of, encryption, digital signing, generating a certificate, and validating a request for a new one-time pad.

6. A method, comprising:
   embedding a one-time pad in a printer;
   storing a copy of the one-time pad in a secure device, where the printer and the secure device use the one-time pad to encrypt and exchange messages;
   receiving a request from the printer for a replacement one-time pad, where the request is encrypted based on a random number generated from a remaining portion of the one-time pad, after the remaining portion of the one-time pad has fallen below a predefined threshold;
   generating the replacement one-time pad for the printer;
   delivering the replacement one-time pad to the printer in association with a printer maintenance event, where the replacement one-time pad is delivered to the printer via a print consumable that stores the replacement one-time pad generated specifically for the printer during production of the print consumable, and where the printer maintenance event involves installing the print consumable in the printer; and
   delivering a copy of the one-time pad to the secure device.

7. The method of claim 6, where a message exchanged between the printer and the secure device is used to one of, control the printer to access a resource, configure a network associated with the printer, configure a device connected to the printer, configure the printer, complete a transaction, display information on the printer, authenticate the printer to the secure device, authenticate the secure device to the printer, track usage of a printer resource by a user, authenticate the secure device to a third party, act as a factor in a multi-factor authentication system, and control the printer to print a document.

8. A method, comprising:
   obtaining, by a printer, a message to be transmitted to a cloud service;
   selecting an unused portion of a one-time pad stored in the printer;
   generating a transmission message comprising an identifier to the unused portion of the one-time pad and an encrypted version of the message generated by encrypting the message using the unused portion of the one-time pad;
   transmitting the transmission message to a secure device associated with the cloud service that stores a copy of the one-time pad;
   marking the unused portion of the one-time pad as a used portion;
   upon detecting a remaining portion of the one-time pad has fallen below a predefined threshold, begin using the remaining portion of the one-time pad as a seed for a random number generator;
   receiving, in association with a maintenance event associated with the printer, a replacement one-time pad, where the replacement one-time pad is delivered to the printer via a print consumable that stores the replacement one-time pad generated specifically for the printer during production of the print consumable, and where the printer maintenance event involves installing the print consumable in the printer; and
   replacing the one-time pad stored in the printer with the replacement one-time pad.

9. The method of claim 8, comprising:
   receiving an encrypted transmission from the secure device, where the encrypted transmission includes an identifier to a decryption portion of the one-time pad and a payload portion;
   decrypting the payload portion of the encrypted transmission using the decryption portion of the one-time pad;

marking the decryption portion of the one-time pad as a used portion; and performing an action based on the decrypted payload portion.

10. The method of claim 8, comprising, upon detecting a remaining portion of the one-time pad has fallen below a predefined threshold, transmit a request for the replacement one-time pad based on a random number generated from the remaining portion of the one-time pad.

* * * * *